United States Patent [19]
Brix

[11] Patent Number: 5,459,110
[45] Date of Patent: Oct. 17, 1995

[54] HIGHLY CHEMICALLY AND THERMALLY RESISTANT BOROSILICATE GLASS WHICH IS CAPABLE OF FORMING A SEAL WITH TUNGSTEN

[75] Inventor: Peter Brix, Mainz, Germany

[73] Assignee: Schott Glaswerke, Mainz, Germany

[21] Appl. No.: 118,842

[22] Filed: Sep. 10, 1993

[30] Foreign Application Priority Data

Sep. 12, 1992 [DE] Germany ............. 42 30 607.8

[51] Int. Cl.⁶ .................................................. C03C 3/093
[52] U.S. Cl. ................................................. 501/67; 501/70
[58] Field of Search ............................................ 501/67, 70

[56] References Cited

U.S. PATENT DOCUMENTS

| | | | |
|---|---|---|---|
| 3,728,139 | 4/1973 | Carrier et al. | 501/67 |
| 4,259,118 | 3/1981 | Sack | 501/67 X |
| 4,737,685 | 4/1988 | Thomas | 501/67 X |
| 4,814,298 | 3/1989 | Nelson et al. | 501/67 X |
| 5,017,521 | 5/1991 | Yale et al. | 501/64 |
| 5,242,869 | 9/1993 | Tarumi et al. | 501/56 |

FOREIGN PATENT DOCUMENTS

| | | | |
|---|---|---|---|
| 35525 | 11/1975 | Australia . | |
| 2126960 | 10/1972 | France | 501/67 |
| 4-33741 | 6/1992 | Japan . | |
| 1191162 | 5/1970 | United Kingdom | 501/70 |
| 2115403 | 2/1983 | United Kingdom . | |

OTHER PUBLICATIONS

Chemical Abstract vol. 77, No. 20, 129954h, Nov., 1972.
Chemical Abstract, vol. 106, No. 24, 200 648, Jun. 1987.
Translation of JP 4–33741 (Abstract), Jun. 1992.
Hienz G. Pfaender, Schott Guide To Glass, p. 110, 1983 (no month).
Doremus *Glass Science* 1973 (no month) John Wiley & Sons, Inc. pp. 160–163.

*Primary Examiner*—Mark I. Bell
*Assistant Examiner*—David Sample
*Attorney, Agent, or Firm*—Millen, White, Zelano & Branigan

[57] ABSTRACT

A highly chemically resistant borosilicate glass which is capable of forming a seal with tungsten and has a glass transition temperature $T_g > 570°$ C., a coefficient of thermal expansion of between 3.95 and $4.5 \times 10^{-6}$ $K^{-1}$, a hydrolytic resistance in accordance with DIN 12111 in class one and a $TK_{100}$ value in accordance with DIN 52326 of at least 240° C. is described which has the composition (in % by weight, based on oxide) of $SiO_2$ 70 to 78, $B_2O_3$ 9 to 12, $Al_2O_3$ 1.5 to 4, $Li_2O$ 0 to 4, $Na_2O$ 1 to 5, $K_2O$ 1 to 5, total of alkali metal oxides 5 to 7, MgO 0 to 3, CaO 1 to 3, BaO 0 to 2, ZnO 0 to 2, $ZrO_2$ 0.5 to 3, total of MgO+CaO+BaO+ZnO+$ZrO_2$ 6 yo 10, and optionally conventional refining agents. It is preferred that the $K_2O:Na_2O$ ratio be greater than 1 and that alkaline earth metal oxides, except for CaO, be omitted. In order to reduce the UV transparency, the glass is particularly suitable for use as a lamp glass in lamps which are subjected to very high temperatures, and as a flame-resistant safety glass.

8 Claims, No Drawings

US 5,459,110

HIGHLY CHEMICALLY AND THERMALLY RESISTANT BOROSILICATE GLASS WHICH IS CAPABLE OF FORMING A SEAL WITH TUNGSTEN

BACKGROUND OF THE INVENTION

The invention relates to a highly chemically and thermally resistant borosilicate glass which is capable of forming a seal with tungsten.

Lamps operating at a temperature above 300° C. are generally made of borosilicate glasses which have high thermal shock resistance. Due to their large processing range these glasses, which can only be softened at high temperatures, for instance at around 700° C., are highly suitable for processing on pressing machines or with an open flame. A high service temperature is particularly desired in applications where the glass must be able to withstand very high ambient temperatures, for example in flashgun tubes or in oven windows.

Compared with normal soda-lime glasses, borosilicate glasses are also distinguished by great hardness, good surface quality, good chemical resistance and improved insulation capacity. Further, it is possible to make such glasses compatible with tungsten power supply wires passed through the glasses by matching the expansion behavior of the glass to that of tungsten.

Glasses of this type which have been known for years are listed, for example, in Pfänder, SCHOTT Guide to Glass, van Nostrand Reinhold Company, New York 1983 (ISBN 0-442-27435-1), page 110. A more recent glass having the composition (in % by weight) 68–82 $SiO_2$; 0.5–5 $Al_2O_3$; 10–18 $B_2O_3$; 3.5–8 $Na_2O+K_2O+Li_2O$; 0–3 CaO+MgO; 0.06–1 refining agent, is described, for example, in JP AS 92/33741.

However, increasing operating temperatures of lamps have resulted in a continual decrease in the safety margin of the glasses, in particular in lamps which are subjected to high temperatures and in the case of very long burning periods, so that it is desirable to further develop these glasses to give improved heat resistance.

SUMMARY OF THE INVENTION

An object of the present invention is to provide borosilicate glasses having very high glass transition temperatures and in which the annealing point is above 570° C. In addition, it is an object to produce these glasses in conventional melting units, i.e., the working point $V_A$ should be lower than 1285° C., and the working range (temperature difference between the working point $V_A$ and the softening point $E_W$) should be at least 350° C. Further, it is an object of the invention that the glasses must be capable of sealing with tungsten by matching thermal expansion behaviors of the glass and tungsten. Also, electrical insulation properties must be good ($TK_{100}$ at least 240° C.) and the glass should have good to very good chemical resistance.

These objects are achieved by the glass described herein. Various other objects, features and attendant advantages of the present invention will be more fully appreciated as the same becomes better understood when considered in conjunction with the disclosure as a whole.

BRIEF DESCRIPTION OF THE INVENTION

The glasses, according to the invention, contain from 70 to 78% by weight of $SiO_2$. Above 78% by weight, the glass becomes increasingly difficult to work with, and the working point $V_A$ becomes unacceptable. The working point $V_A$ is taken to mean the temperature in ° C. at which the glass has a viscosity of $10^4$ dPas. At an $SiO_2$ content of less than 70% by weight, the thermal expansion of the glass increases, so that it is no longer possible to ensure sealing to the tungsten metal passing through the glass. An $SiO_2$ content of from 73 to 75% by weight is particularly preferred.

In order to achieve good chemical resistance, devitrification stability and electrical insulation capacity, the glasses have a $B_2O_3$ content of 9–12% by weight. Within the stated limits, the $B_2O_3$ content, as a flux, simplifies melting of the glasses.

The $Al_2O_3$ content of these glasses is between 1.5 and 4% by weight. If higher $Al_2O_3$ contents are used, the working point increases unacceptably and the tendency towards phase separation increases, whereas if the content drops below the lower limit of 1.5% by weight, the devitrification tendency increases significantly. Particularly favorable results are achieved at an $Al_2O_3$ content of from 2 to 3% by weight.

Alkali metal oxides should be present in the glasses in a total amount of from 5 to 7% by weight. They serve as a flux for achieving improved meltability of the glasses and for modifying the coefficient of thermal expansion, which does not achieve the desired values outside the stated range of alkali metal oxide content. The $Na_2O$ and $K_2O$ contents are preferably each between 1 and 5% by weight. The glasses may furthermore contain from 0 to 4% by weight of $Li_2O$, but an $Li_2O$-free glass is preferred. It is particularly preferred that the $Na_2O$ content be between 1 and 3% by weight and the $K_2O$ content be between 3 and 5% by weight, as long as the total amount of the alkali metal oxide is 5–7%. It has furthermore been found that the insulation capacity of the glass is increased if the ratio by weight between $K_2O$ and $Na_2O$ is greater than 1. This weight ratio is therefore preferred.

In order to increase the glass transition temperature, the glasses furthermore may contain from 0 to 3% by weight of MgO, 1 to 3% by weight of CaO and from 0 to 2% by weight of BaO. All or some of the BaO may also be replaced by SrO. In addition to these alkaline earth metal oxides, the glasses furthermore may contain from 0 to 2% by weight of ZnO and from 0.5 to 3% by weight of $ZrO_2$. $ZrO_2$ improves the chemical resistance, but the content preferably does not exceed 3% by weight since glasses with such content can only be melted with difficulty without melt relics (raw materials which remain unmelted in the melt). The total content of alkaline earth metal oxides+ZnO+$ZrO_2$ should be between 6 and 10% by weight. At values below this range, the desired high transition temperature can no longer be achieved. At values above this range, phase separation may occur, in particular if MgO and BaO are used, so that usable glasses cannot be obtained. It is therefore preferred if alkaline earth metal oxides are omitted entirely, apart from calcium oxide, which is preferably used in an amount from 2 to 3% by weight. ZnO is preferably used in an amount of from 1 to 2% by weight, and $ZrO_2$ in an amount of from 2 to 3% by weight, as long as the total amount of an alkaline earth metal oxide+ZnO+$ZrO_2$ is 6–10%.

The glasses may be prepared by conventional methods. For example, the glass components are mixed and melted, then refined and mixed to provide homogeneity, and then cooled.

The glasses, in accordance with this invention, are highly chemically resistant borosilicate glasses capable of forming a seal with tungsten and have a glass transition temperature $T_g$>570° C., a coefficient of thermal expansion of 3.95 to $4.5 \times 10^{-6}$ $K^{-1}$, preferably 4.0 to $4.25 \times 10^{-6}$ $K^{-1}$, a hydrolytic resistance in accordance with DIN 12111 in class one and a $TK_{100}$ value in accordance with DIN 52326 of at least 240° C. In manufacturing lamps from the glasses, the glass is subject to a washing process. Thus, the glass must be water resistant. Further, they must withstand high humidity in practical use in order to prevent frosting.

A preferred application for the glasses of the invention is as lamp glass for lamps which are subjected to very high temperatures such as used for evacuated tubes for heavy duty lamps of 400–2000 watt power, e.g., floodlight lamps. Such lamps generally emit considerable amounts of UV radiation. If this radiation is undesired, $TiO_2$ in amount of up to 1.5% by weight, preferably from 0.5 to 1% by weight, can be added to the glass, thus considerably reducing the UV radiation.

The ability to withstand very high temperatures, for example, above 600° C. for long periods, provides a further preferred use of the glass as a flame-resistant safety glass in fireproof glazing.

The glass can be refined by means of conventional refining agents, such as $As_2O_3$, $Sb_2O_3$, $CeO_2$, NaCl, $CaF_2$ or NaF, which are then found in the finished glass in amounts of 0.05 to 1% by weight, depending on the amount and type of refining agent used.

In the foregoing and in the following examples, all temperatures are set forth uncorrected in degrees Celsius; and, unless otherwise indicated, all parts and percentages are be weight.

The entire disclosure of all applications, patents and publications, cited above and below, and of corresponding German application No. P 42 30 607.8, filed Sep. 12, 1992, are hereby incorporated by reference.

EXAMPLES 42 glasses of various composition were produced by melting conventional raw materials at 1620° C., refining the glass material at this temperature for 1½ hours, and subsequently stirring the mixture at 1550° C. for 30 minutes to achieve homogenization. The compositions of the 41 glasses in % by weight is shown in Table 1, and the physical properties of these glasses are shown in Table 2.

Glasses 4, 25, 27, 29–34 and 36–41 have the composition according to the invention, and glasses 1–3, 5–24, 26, 28 and 35 are for comparison. The data demonstrate the susceptibility of these glass systems to phase separation or deviation from the desired physical values, if the amounts of the components are even slightly outside those of the invention.

For glass 41, the acid resistance in accordance with DIN 12116 and the alkali resistance in accordance with DIN 52322 (ISO 695) were also determined. In both cases, the glass falls in acid or alkali class one. Since it is also in hydrolytic class one in accordance with DIN 12111, it is clear that it is a highly chemically resistant glass. Therefore, this glass is useful in the construction of chemical apparatus. For example, as glass components of process plants, such as in distillation and extraction columns, as the glass in inspection windows for steam boilers or high-pressure plants, in the production of coffey jars, or for oven windows.

In order to demonstrate the reduction in UV emission by addition of $TiO_2$, example 41 was repeated, but the $SiO_2$ content was reduced by 0.5% by weight (absolute to 73.7 by weight) and instead 0.5% by weight of $TiO_2$ was added. Transmission of UV light at a wavelength of 296.7 nm and a sample thickness of 1 nm was 58.5% for glass 41 (without additional $TiO_2$) and dropped to 11.5 percent after addition of 0.5% by weight of $TiO_2$. The transmission in the visible region of the spectrum remained virtually unchanged.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

TABLE 1

Synthesis Data for the Glasses in % By Weight
Each glass additionally contains 1.50% of NaCl for refining.

| No. | $SiO_2$ | $B_2O_3$ | $Al_2O_3$ | $Na_2O$ | $K_2O$ | MgO | CaO | BaO | ZnO | $ZrO_2$ |
|---|---|---|---|---|---|---|---|---|---|---|
| 1 | 80.00 | 9.00 | 1.50 | 1.00 | 3.00 | 0.50 | 3.00 | 1.00 | 0.50 | 0.50 |
| 2 | 67.50 | 15.00 | 1.50 | 1.00 | 3.00 | 3.00 | 3.00 | 1.00 | 2.00 | 3.00 |
| 3 | 65.00 | 9.00 | 6.00 | 1.00 | 3.00 | 3.00 | 3.00 | 5.00 | 2.00 | 3.00 |
| 4 | 73.50 | 9.00 | 1.50 | 5.00 | 1.00 | 3.00 | 1.00 | 1.00 | 2.00 | 3.00 |
| 5 | 64.00 | 15.00 | 6.00 | 5.00 | 3.00 | 0.50 | 3.00 | 1.00 | 2.00 | 0.50 |
| 6 | 64.00 | 15.00 | 1.50 | 5.00 | 3.00 | 3.00 | 1.00 | 5.00 | 2.00 | 0.50 |
| 7 | 67.50 | 15.00 | 6.00 | 1.00 | 3.00 | 0.50 | 1.00 | 1.00 | 2.00 | 3.00 |
| 8 | 65.00 | 15.00 | 6.00 | 5.00 | 1.00 | 3.00 | 3.00 | 1.00 | 0.50 | 0.50 |
| 9 | 71.50 | 9.00 | 1.50 | 5.00 | 3.00 | 0.50 | 1.00 | 5.00 | 0.50 | 3.00 |
| 10 | 72.00 | 9.00 | 6.00 | 3.00 | 1.00 | 0.50 | 1.00 | 5.00 | 2.00 | 0.50 |
| 11 | 69.50 | 15.00 | 1.50 | 1.00 | 3.00 | 3.00 | 1.00 | 5.00 | 0.50 | 0.50 |
| 12 | 69.50 | 9.00 | 6.00 | 5.00 | 3.00 | 3.00 | 1.00 | 1.00 | 2.00 | 0.50 |
| 13 | 62.50 | 9.00 | 6.00 | 5.00 | 3.00 | 3.00 | 3.00 | 5.00 | 0.50 | 3.00 |
| 14 | 69.00 | 15.00 | 6.00 | 3.00 | 1.00 | 0.50 | 1.00 | 1.00 | 0.50 | 3.00 |
| 15 | 64.00 | 15.00 | 1.50 | 5.00 | 1.00 | 0.50 | 3.00 | 5.00 | 2.00 | 3.00 |
| 16 | 72.90 | 14.15 | 1.65 | 1.00 | 2.75 | 1.90 | 2.95 | 1.65 | | 1.05 |
| 17 | 75.40 | 12.50 | 2.50 | 1.50 | 2.60 | 2.00 | 3.00 | | 0.50 | |
| 18 | 73.60 | 15.00 | 1.50 | 1.00 | 2.90 | 2.00 | 3.00 | | | 1.00 |
| 19 | 75.00 | 13.00 | 1.50 | 1.00 | 3.10 | 1.75 | 3.00 | 1.65 | | |

TABLE 1-continued

Synthesis Data for the Glasses in % By Weight
Each glass additionally contains 1.50% of NaCl for refining.

| No. | SiO₂ | B₂O₃ | Al₂O₃ | Na₂O | K₂O | MgO | CaO | BaO | ZnO | ZrO₂ |
|---|---|---|---|---|---|---|---|---|---|---|
| 20 | 74.80 | 13.00 | 1.50 | 2.95 | 1.25 | 0.50 | 3.00 | | | 3.00 |
| 21 | 76.40 | 12.00 | 1.50 | 3.60 | 1.00 | 0.80 | 3.00 | 0.60 | | 1.10 |
| 22 | 73.70 | 11.00 | 2.00 | 4.10 | | 2.30 | 3.00 | | 1.60 | 2.30 |
| 23 | 73.20 | 12.00 | 1.50 | 4.50 | | | 4.85 | | 2.00 | 1.95 |
| 24 | 74.00 | 12.00 | 3.00 | 1.90 | 3.00 | | 3.10 | | | 3.00 |
| 25 | 74.70 | 11.00 | 2.00 | 2.40 | 3.00 | | 2.40 | | 2.00 | 2.50 |
| 26 | 71.00 | 12.00 | 3.20 | 1.90 | 3.00 | | 2.60 | | 2.50 | 3.80 |
| 27 | 77.60 | 9.00 | 1.50 | 2.50 | 2.95 | | 2.35 | | 1.60 | 2.50 |
| 28 | 75.50 | 10.00 | 5.00 | 6.00 | | | 1.50 | 2.00 | | |
| 29 | 75.45 | 10.00 | 2.50 | 2.00 | 3.60 | | 2.35 | | 1.60 | 2.50 |
| 30 | 75.90 | 10.00 | 2.00 | 2.20 | 3.45 | | 2.35 | | 1.60 | 2.50 |
| 31 | 75.05 | 10.00 | 2.50 | 2.00 | 4.00 | | 2.35 | | 1.60 | 2.50 |
| 32 | 74.80 | 10.00 | 2.50 | 2.00 | 4.25 | | 2.35 | | 1.60 | 2.50 |
| 33 | 74.25 | 11.00 | 2.50 | 2.30 | 3.50 | | 2.35 | | 1.60 | 2.50 |
| 34 | 73.65 | 10.00 | 3.50 | 3.05 | 2.70 | | 3.00 | | 1.60 | 2.50 |
| 35 | 72.85 | 10.00 | 3.50 | 2.00 | 3.80 | | 3.25 | | 1.60 | 3.00 |
| 36 | 74.50 | 10.00 | 2.50 | 2.00 | 4.55 | | 2.35 | | 1.60 | 2.50 |
| 37 | 73.50 | 11.05 | 2.90 | 2.00 | 4.25 | | 2.70 | | 1.60 | 2.00 |
| 38 | 73.60 | 11.05 | 2.90 | 2.00 | 4.15 | | 2.70 | | 1.60 | 2.00 |
| 39 | 73.60 | 11.10 | 2.90 | 2.20 | 3.90 | | 2.70 | | 1.60 | 2.00 |
| 40 | 73.70 | 11.10 | 2.90 | 2.20 | 3.80 | | 2.70 | | 1.60 | 2.00 |
| 41 | 74.20 | 11.10 | 2.90 | 1.70 | 3.80 | | 2.70 | | 1.60 | 2.00 |

TABLE 2

Properties of the Glasses

| No. | Haze[1] | alpha[2] | $T_g$[3] | AP[4] | $E_w$[5] | $V_A$[6] | Density[7] | $TK_{100}$[8] | H[9] |
|---|---|---|---|---|---|---|---|---|---|
| 1 | 2 | 3.62 | 599 | 636 | 915 | 1320 | 2.320 | 322 | 26 |
| 2 | 2 | 4.67 | 621 | 648 | 919 | 1252 | 2.487 | 250 | 47 |
| 3 | 5 | 4.16 | 585 | 598 | 878 | 1186 | 2.389 | 337 | 83 |
| 4 | 0 | 4.50 | 579 | 597 | 831 | 1210 | 2.410 | 240 | 29 |
| 5 | 0 | 5.53 | 566 | 570 | 763 | 1089 | 2.397 | 229 | 28 |
| 6 | 0 | 5.47 | 561 | 567 | 753 | 1051 | 2.478 | 297 | 69 |
| 7[10] | 0 | 4.03 | 559 | 593 | 863 | 1338 | 2.312 | 280 | 9 |
| 8 | 2 | 5.20 | 585 | 622 | 794 | 1124 | 2.375 | 189 | 63 |
| 9 | 0 | 5.34 | 594 | 603 | 817 | 1149 | 2.493 | 267 | 20 |
| 10 | 0 | 4.25 | 589 | 587 | 873 | 1328 | 2.398 | 202 | 8 |
| 11 | 6 | 4.16 | 578 | 608 | ass | 1176 | 2.384 | 352 | 381 |
| 12 | 0 | 5.44 | 577 | 585 | 808 | 1203 | 2.398 | 218 | 18 |
| 13 | 0 | 6.01 | 598 | 600 | 808 | 1126 | 2.530 | 240 | 29 |
| 14 | 0 | 4.00 | 565 | 580 | 847 | 1313 | 2.299 | 227 | 9 |
| 15 | 1 | 4.94 | 573 | 583 | 810 | 1071 | 2.501 | 280 | 84 |
| 16 | 3 | 3.92 | 587 | 608 | 880 | 1260 | 2.304 | 290 | 62 |
| 17 | 2 | 3.87 | 591 | 610 | 872 | 1222 | 2.335 | 330 | 76 |
| 18 | 3 | 3.78 | 584 | 600 | 867 | 1225 | 2.301 | 339 | 67 |
| 19 | 3 | 3.95 | 591 | 616 | 876 | 1227 | 2.327 | 338 | 60 |
| 20 | 1 | 3.75 | 584 | 616 | 865 | 1234 | 2.325 | 268 | 43 |
| 21 | 2 | 3.98 | 574[11] | 627 | 861 | 1205 | 2.330 | 260 | 223 |
| 22 | 2 | 4.15 | 577 | 637 | 881 | 1215 | 2.367 | 217 | 64 |
| 23 | 6 | | | | | | | | |
| 24 | 1 | | | | | | | | |
| 25 | 0 | 4.03 | 575 | 605 | 847 | 1240 | 2.353 | 283 | 13 |
| 26 | 0.5 | 4.05 | 589 | 603 | 859 | 1261 | 2.364 | 268 | 15 |
| 27 | 0 | 3.95 | 589 | 617 | 859 | 1271 | 2.355 | 285 | 16 |
| 28 | 0 | 4.65 | 589 | 597 | 816 | 1208 | 2.353 | 180 | 12 |
| 29 | 0 | 3.98 | 589 | 610 | 865 | 1283 | 2.345 | 283 | 9 |
| 30 | 0 | 4.07 | 585 | 611 | 848 | 1257 | 2.353 | 287 | 9 |
| 31 | 0 | 4.19 | 589 | 609 | 870 | 1260 | 2.365 | 287 | 10 |
| 32 | 0 | 4.23 | 589 | 610 | 864 | 1255 | 2.358 | 288 | 11 |
| 33 | 0 | 4.14 | 580 | 603 | 870 | 1241 | 2.349 | 280 | 15 |
| 34 | 0 | 4.40 | 597 | 609 | 848 | 1254 | 2.365 | 240 | 14 |
| 35 | 0.5 | | | | | | | | |
| 36 | 0 | 4.35 | 591 | 606 | 847 | 1252 | 2.361 | 290 | 12 |
| 37 | 0 | 4.32 | 587 | 601 | 837 | 1234 | 2.353 | 283 | 15 |
| 38 | 0 | 4.36 | 595 | 603 | 842 | 1232 | 2.350 | 293 | 13 |
| 39 | 0 | 4.37 | 589 | 602 | 834 | 1225 | 2.354 | 278 | 17 |

TABLE 2-continued

Properties of the Glasses

| No. | Haze[1] | alpha[2] | $T_g$[3] | AP[4] | $E_W$[5] | $V_A$[6] | Density[7] | $TK_{100}$[8] | H[9] |
|---|---|---|---|---|---|---|---|---|---|
| 40 | 0 | 4.31 | 588 | 604 | 838 | 1244 | 2.352 | 273 | 13 |
| 41 | 0 | 4.25 | 599 | 606 | 858 | 1256 | 2.348 | 286 | 14 |

[1]visual assessment of haze on a scale from 0 to 10
[2]coefficient of thermal expansion in $10^{-6} K^{-1}$ in a temperature range from 20 to 300° C.
[3]dilatometric glass transition temperature in °C.
[4]annealing point, temperature for a viscosity of $10^{13}$ dPas in °C.
[5]softening point, temperature for a viscosity of $10^{7.6}$ dPas in °C.
[6]working point, temperature for a viscosity of $10^4$ dPas in °C.
[7]density of the glass in $10^3$ kg·$m^3$
[8]temperature at $10^2$ ohm·cm in accordance with DIN 52326
[9]hydrolytic resistance in µg of $Na_2O/g$ in accordance with DIN 12111
[10]partially undissolved melt relics
[11]a further $T_g$ at 630° C.

We claim:

1. A highly chemically resistant borosillicate glass which is capable of forming a seal with tungsten and has a glass transition temperature of greater than 570° C., a coefficient of thermal expansion of between 3.95 and 4.5×$10^{-6}$ $K^{-1}$, a hydrolytic resistance in accordance with DIN 12111 in class one, and $TK_{100}$ value in accordance with DIN 52326 of at least 240° C., having a composition in % by weight, based on oxide, consisting essentially of

| | |
|---|---|
| $SiO_2$ | 70–78 |
| $B_2O_3$ | 9–12 |
| $Al_2O_3$ | 1.5–4 |
| $Li_2O$ | 0–4 |
| $K_2O$ | 1–5, |
| $Na_2O$ | 1–5, |

| | |
|---|---|
| MgO | 0–3 |
| CaO | 1–3 |
| BaO + SrO | 0–2 |
| ZnO | 0–2, and |
| $ZrO_2$ | 0.5–3, |

2. The borosilicate glass of claim 1, having a composition of

| | |
|---|---|
| $SiO_2$ | 73–75 |
| $B_2O_3$ | 9–12 |
| $Al_2O_3$ | 2–3 |
| $Na_2O$ | 1–3 |
| $K_2O$ | 3–5 |
| CaO | 2–3 |
| ZnO | 1–2 |
| $ZrO_2$ | 2–3 | wherein the sum of $Na_2O+K_2O$ is 5–7 and the sum of $CaO+ZnO+ZrO_2$ is 6–10.

3. The borosilicate glass of claim 1, wherein the $K_2O/Na_2O$ weight ratio is >1.

4. The borosilicate glass of claim 1, further having a $TiO_2$ content of up to 1.5% by weight.

5. The borosilicate glass of claim 1, which consists essentially of $SiO_2$, $B_2O_3$, $Al_2O_3$, $Li_2O$, $K_2O$, $Na_2O$, MgO, CaO, BaO, SrO, ZnO, $ZrO_2$ and 0–1.5% $TiO_2$.

6. The borosilicate glass of claim 1, further having a $TiO_2$ content of 0.5 to 1.5% by weight.

7. The borosilicate glass of claim 1, wherein the working point, $V_A$, is lower than 1285° C.

8. The borosilicate glass of claim 1, wherein the temperature difference between the working point, $V_A$, and the softening point, $E_w$, is at least 350° C.

* * * * *